United States Patent
Nagaya et al.

(10) Patent No.: US 6,799,432 B2
(45) Date of Patent: Oct. 5, 2004

(54) VEHICULAR AIR CONDITIONING UNIT

(75) Inventors: Masakazu Nagaya, Nagoya (JP); Kazuo Kito, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/653,759

(22) Filed: Sep. 3, 2003

(65) Prior Publication Data

US 2004/0045309 A1 Mar. 11, 2004

(30) Foreign Application Priority Data

Sep. 5, 2002 (JP) .................................. 2002-260031

(51) Int. Cl.[7] .................................................. B60H 1/32
(52) U.S. Cl. ...................................... 62/244; 454/107
(58) Field of Search .......................... 62/244; 454/107; 165/42, 43; 425/444, 556

(56) References Cited

U.S. PATENT DOCUMENTS 5,350,555 A * 9/1994 Tsuda et al. ................. 264/242
5,393,262 A * 2/1995 Hashimoto et al. ......... 454/155
5,482,506 A * 1/1996 Tsuda et al. ................. 454/155
5,690,881 A * 11/1997 Horie et al. ................. 264/263

FOREIGN PATENT DOCUMENTS

JP          10-29420        2/1998

* cited by examiner

Primary Examiner—William E. Tapolcai
(74) Attorney, Agent, or Firm—Harness, Dickey & Pierce, PLC (57) ABSTRACT

In a left and right temperature independent control-type air conditioning unit for a vehicle, a case is constructed of a first case and a second case. An air passage in the case is divided into a first air passage through which air flows toward a right region of a compartment and a second air passage through which air flows toward a left region of the compartment by a partition wall. The first and second cases are connected by engaging a first case end surfaces with a second case end surface. Pin contact portions are formed on the first and second cases adjacent to the case end surface. The pin contact portions are disposed to oppose each other between the first case and the second case. The partition wall is fixed by interposing its periphery between the pin contact portions of the first and the second cases.

9 Claims, 5 Drawing Sheets

VEHICULAR AIR CONDITIONING UNIT

CROSS REFERENCE TO RELATED APPLICATION

This application is based on Japanese Patent Application No. 2002-260031 filed on Sep. 5, 2002, the disclosure of which is incorporated herein by reference.

FIELD OF THE INVENTION

The present invention relates to a right and left temperature independent control-type air conditioning unit that separately controls temperature of right and left regions of a passenger compartment. Particularly, the present invention relates to a fixing structure of a case of the air conditioning unit and a partition wall that divides an air passage in the case into a first air passage and a second air passage.

BACKGROUND OF THE INVENTION

For example, JP-A-10-29420 discloses a right and left temperature independent control-type vehicular air conditioning unit. In the air conditioning unit, an air passage formed in an air conditioning case is divided into a driver side air passage and a passenger side air passage by a partition wall.

As a structure of fixing such partition wall to an air conditioning case, for example, examples shown in FIGS. 4A through 6 are proposed. According to the example shown in FIGS. 4A through 4D, a resinous air conditioning case has a right case 11a and a left case 11b. The right case 11a and the left case 11b are fixed to each other in a condition that a periphery of a resinous partition wall 12 is interposed between an engaging end surface 26a of the right case 11a and an engaging end surface 26b of the left case 11b.

Figure 4A:
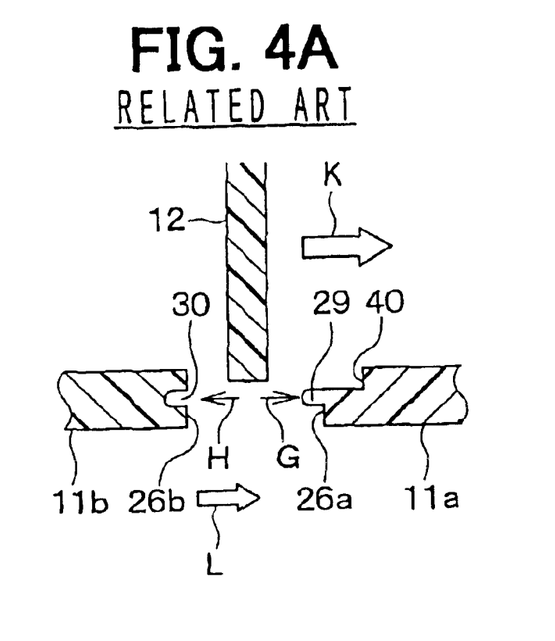
FIG. 4A is a partly cross-sectional view for showing a step of fixing a partition wall to a case according to a related art.
Figure 4B:
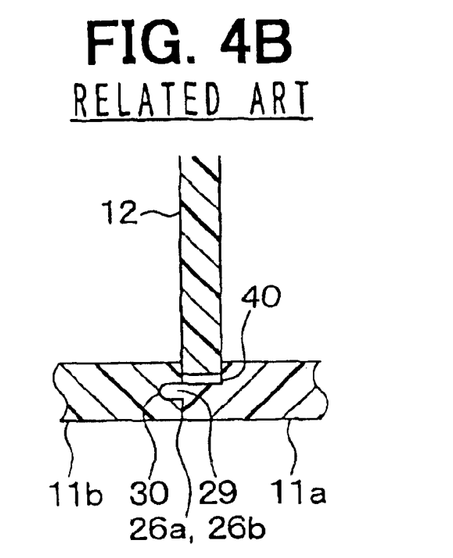
FIG. 4B is a partly cross-sectional view of the partition wall fixed by the step of FIG. 4A.

The right case 11a is formed with a step 40 on its engaging end surface 26a. The step 40 is recessed from the end of the case by a distance same as a thickness of the partition wall 12. As shown in FIG. 4A, first, the periphery of the partition wall 12 is placed on the step 40 as shown by an arrow K. Next, the engaging end surface 26b of the left case 11b is brought into contact with the engaging end surface 26a of the right case 11a, as shown by an arrow L. In this way, the periphery of the partition wall 12 is interposed and fixed between the engaging end surfaces 26a, 26b of the cases 11a, 11b.

Figure 4C:
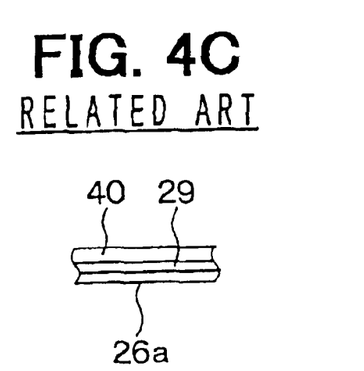
FIG. 4C is an end view of an engaging end surface of a left case viewed along an arrow H of FIG. 4A.
Figure 4D:
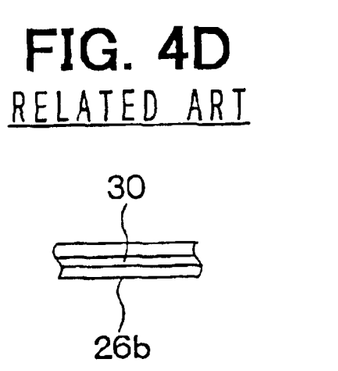
FIG. 4D is an end view of an engaging end surface of a right case viewed along an arrow G of FIG. 4A.

Further, a linear projection 29 is formed on the engaging end surface 26a to extend parallel to a longitudinal direction of the engaging end surface 26a, as shown in FIG. 4C. A linear groove 30 is formed on the engaging end surface 26b to extend parallel to a longitudinal direction of the engaging surface 26b, as shown in FIG. 4D. The linear projection 29 is fitted in the linear groove 30, so the cases 11a, 11b are sealed between the engaging end surfaces 26a, 26b.

In a case that the cases 11a, 11b are used for a normal-type vehicular air conditioning unit, which does not have right and left temperature independent control function, the partition wall 12 is not required. Thus, the partition wall 12 is removed from the cases 11a, 11b. However, the periphery of the partition wall 12 generally has a complicated structure to correspond to a complicated form of the air passage in the air conditioning unit. Also, since the entire periphery of the partition wall 12 is interposed between the engaging end surfaces 26a, 26b, a total length of the periphery of the partition wall 12 increases.

In addition, since the cases 11a, 11b are resin molded articles, the precision of dimensions is generally lower than that of metallic articles. Therefore, it is difficult to closely fix the periphery of the partition wall 12 between the engaging end surfaces 26a, 26b at the same time as fitting the linear projection 29 into the linear groove 30. This results in an increase in the number of steps for assembling the air conditioning.

Figure 5A:
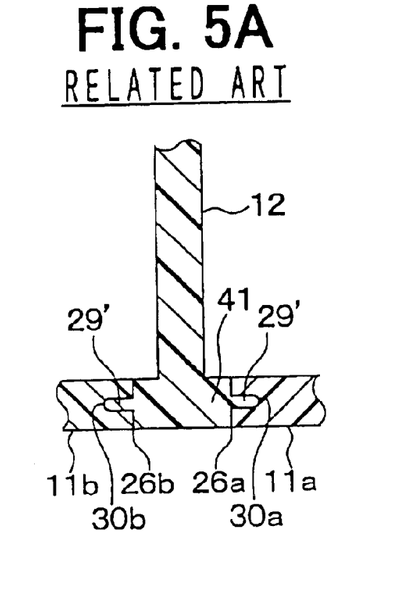
FIG. 5A is a partly cross-sectional view of a partition wall and a case for showing a fixing structure of the partition wall according to another related art.
Figure 5B:
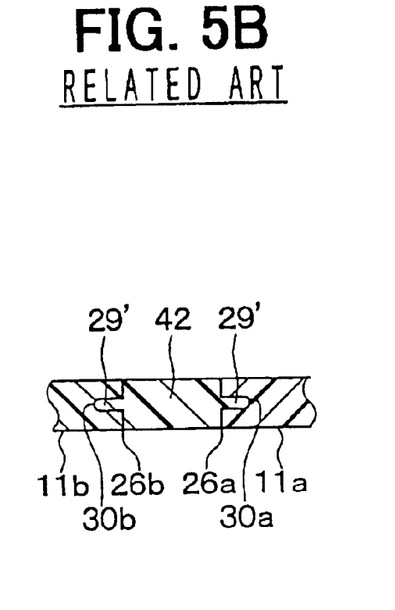
FIG. 5B is a partly cross-sectional view of the case without having the partition wall according to the related art.

To address this matter, a structure shown in FIGS. 5A and 5B is proposed. The partition wall 12 is formed with a substantially T-shaped fixing portion 41 on its periphery. The fixing portion 41 has linear projections 29' on the end surfaces. The fixing portion 41 is arranged between the engaging end surface 26a, 26b of the cases 11a, 11b so that the linear projections 29' are fitted in linear grooves 30a, 30b formed on the engaging end surfaces 26a, 26b. Therefore, the partition wall 12 is fixed by interposing the T-shaped fixing portion 41 between the engaging end surfaces 26a, 26b.

According to the example shown in FIG. 5A, the partition wall 12 is fixed merely by fitting the linear projections 29' of the fixing portion 41 into the linear grooves 30a, 30b. Therefore, the partition wall 12 is easily fixed, and hence steps of the assembly is reduced, as compared with the structure shown in FIGS. 4a and 4B. However, in a case that the cases 11a, 11b are used for the normal-type air conditioning unit, a plate member 42 is required between the engaging end surfaces 26a, 26b, in place of the fixing portion 41 of the partition wall 12. Since the plate member 42 is additionally required, manufacturing costs increase.

Figure 6:
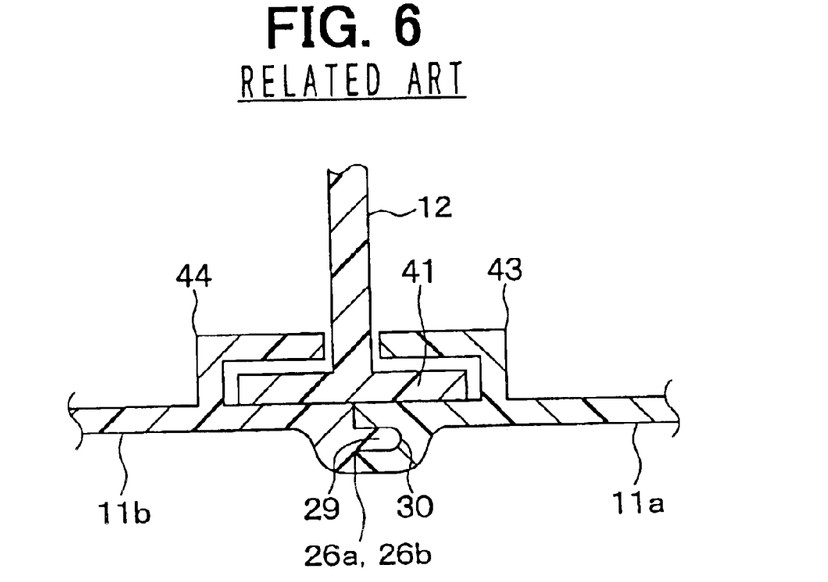
FIG. 6 is a partly cross-sectional view of a partition wall and a case for showing a fixing structure of the partition wall according to further another related art.

According to another example shown in FIG. 6, the cases 11a, 11b are integrally provided with holding wall portions 43, 44 on the inside walls. The holding wall portions 43, 44 bend to have substantially L-shaped cross-sections. The partition wall 12 is fixed by interposing T-shaped fixing portion 41 in the L-shaped holding wall portions 43, 44. However, the shape of the cases 11a, 11b are complicated because of the L-shaped holding wall portions 43, 44. Thus, this increases the manufacturing costs.

SUMMARY OF THE INVENTION

The present invention is made in view of the foregoing matter and it is an object of the present invention to provide a simple fixing structure of a case of an air conditioning unit and a partition wall, which separates an air passage in the case into a first air passage for a right region of a passenger compartment and a second air passage for a left region of the passenger compartment.

According to the present invention, an air conditioning unit for a vehicle includes a case and a partition wall disposed in the case. The case defines an air passage through which air flows toward a passenger compartment of the vehicle. The partition wall is disposed so that it divides the air passage into a first air passage through which air flows toward a right region of the passenger compartment and a second air passage through which air flows toward a left region of the passenger compartment.

The case includes a first case for forming the first air passage and a second case for forming the second air passage. The first case and the second case are joined to each other by connecting a first case end surface of the first case and a second case end surface of the second case. Each of the first case and the second case has a plurality of pin contact portions. The partition wall is interposed between the pin contact portions of the first case and the pin contact portions of the second case.

Accordingly, since the partition wall is interposed between and fixed by the pin contact portions, the partition wall is easily fixed. Since the partition wall is not interposed between the first case end surface and the second case end surface, it is not necessary to closely contact the partition wall with the first case end surface and the second case end surface. Further, the first case and the second case are also used for a case of a normal-type air conditioning unit, which does not separately control temperature of the right region and the left region, by merely removing the partition wall.

Preferably, the pin contact portions are provided as portions that are knocked by ejector pins after an injection molding so that the cases are quickly removed from molding dies. Since the pin contact portions are used not only for the portions for receiving the ejector pin but also for the portions fixing the partition wall. Thus, it is not necessary to additionally form portions for fixing the partition wall.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
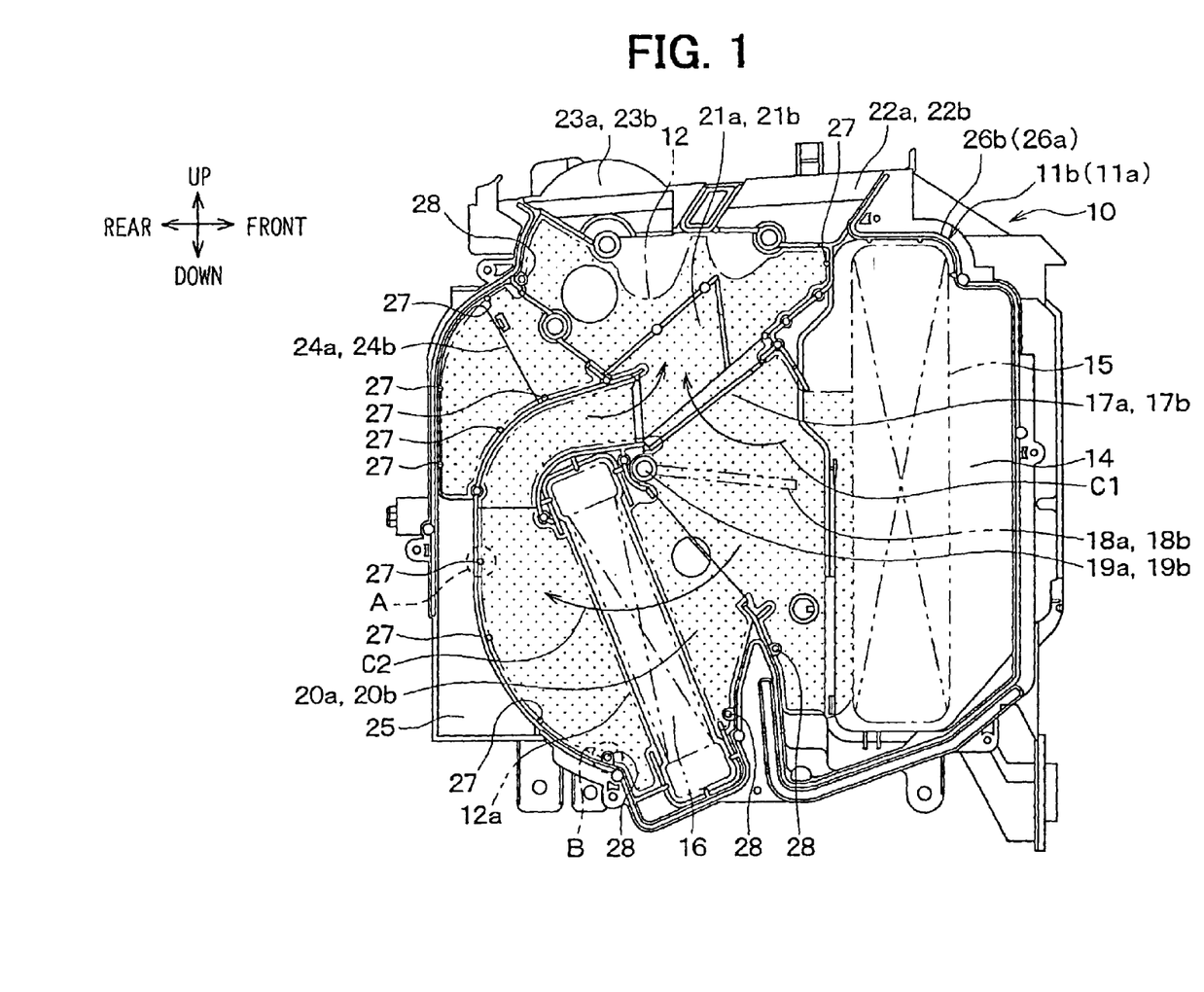
FIG. 1 is an end view of a left case of an air conditioning unit, viewed from a right side of a vehicle, according to the embodiment of the present invention.
Figure 2:
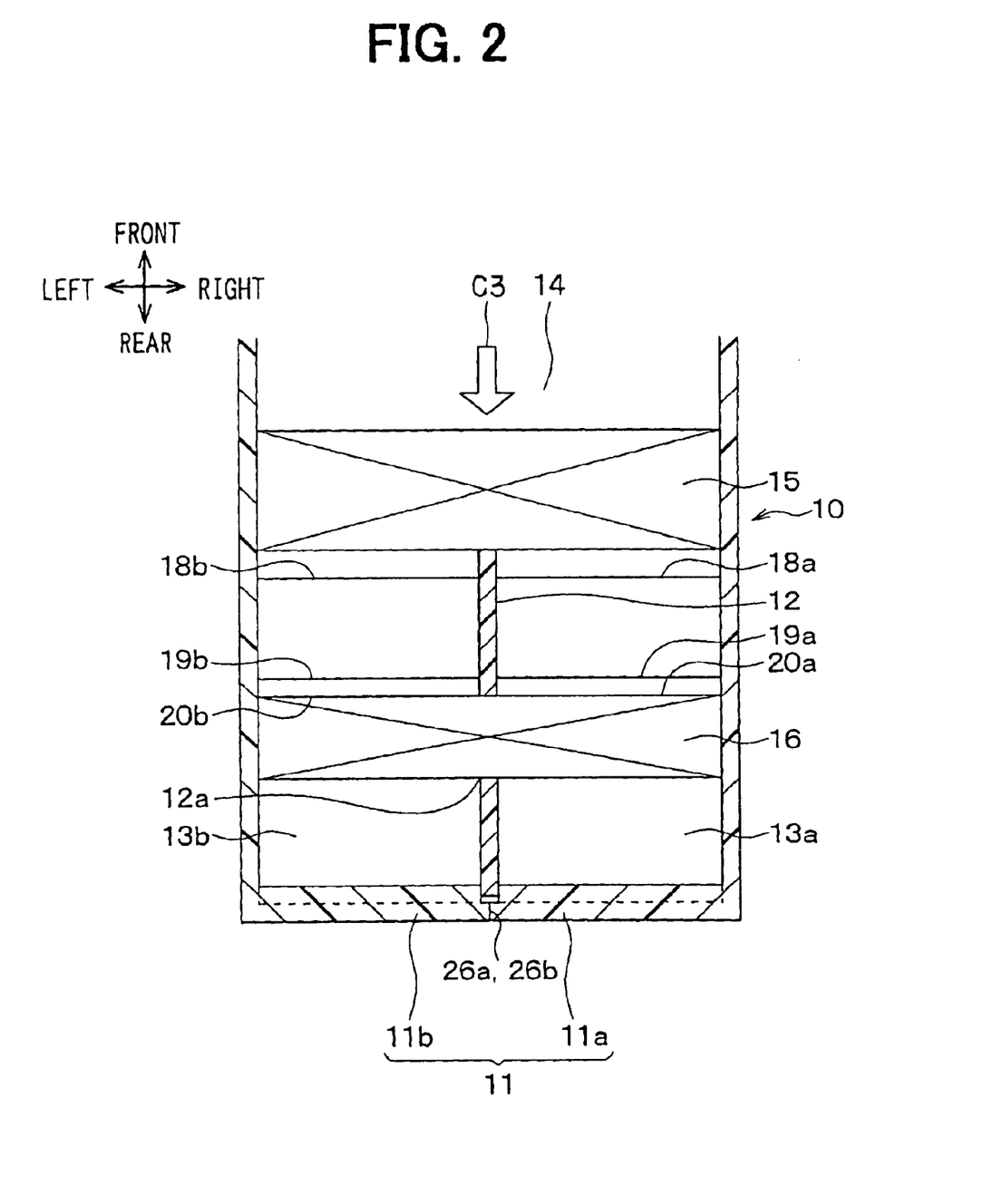
FIG. 2 is a cross-sectional view of the air conditioning case according to the embodiment of the present invention.

FIG. 1 shows the shape of a case 11 of an air conditioning unit 10 for a vehicle of the embodiment. Specifically, FIG. 1 shows an end view of a left case 11b of the case 11 when it is viewed from a right side of the vehicle. For the sake of convenience, heat exchangers 15, 16, doors 18a and a partition wall 12 are illustrated with chain double-dashed lines in FIG. 1. FIG. 2 shows a cross-sectional view of the case 11 when viewed from the top of the case 11.

Figure 3A:
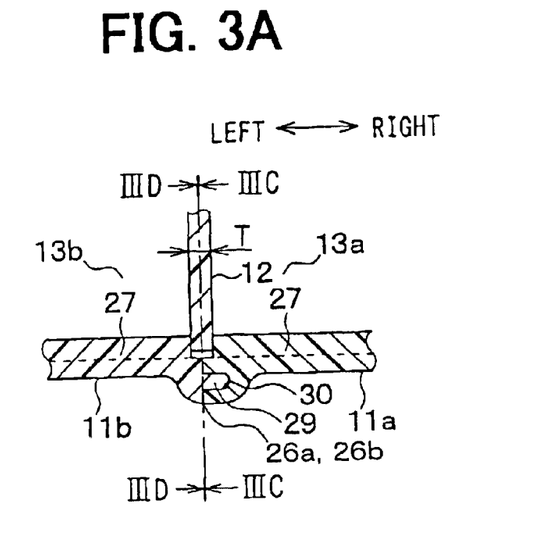
FIG. 3A is a cross-sectional view of a first pin contact portion encircled with a dotted line in FIG. 1.
Figure 3B:
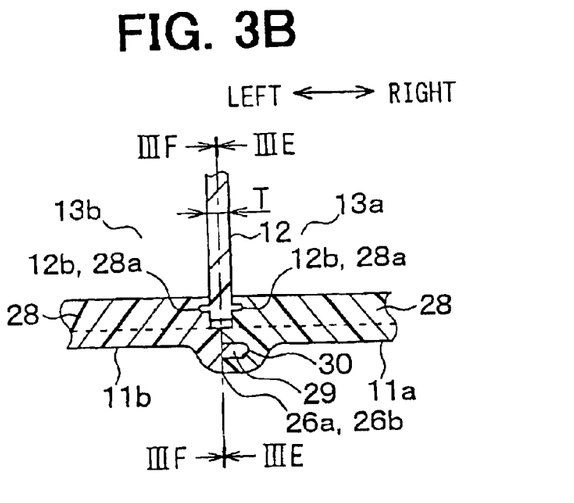
FIG. 3B is a cross-sectional view of a second pin contact portion encircled with a dotted line in FIG. 1.

FIG. 3A shows an enlarged cross-sectional view of a part of the case 11 encircled with a dotted line A in FIG. 1. FIG. 3B shows an enlarged cross-sectional view of another part of the case 11 encircled with a dotted line B in FIG. 1. Further, FIGS. 3C through 3F are cross-sectional views of the parts of the case 11 taken along lines IIIC—IIIC, IIID—IIID, IIIE—IIIE, and IIIF—IIIF, respectively. In FIGS. 1 through 3B, up and down, front and rear, and left and right arrows show directions of the case 11 in a condition it is mounted on the vehicle.

First, schematic structure of the air conditioning unit 10 will be described. The air conditioning unit 10 separately controls temperature of air blown toward a left region and a right region of a passenger compartment. The air conditioning unit 10 is mounted in a substantially middle position in the vehicle left and right direction in an inside space of an instrument panel (not shown) at the front portion of the passenger compartment.

The air conditioning unit 10 receives air from a blower unit (not shown). The blower unit is generally arranged adjacent to the air conditioning unit 10 on a passenger (assistant driver) seat side in the inside space of the instrument panel. Although not illustrated, the blower unit includes an inside/outside air switching box and a centrifugal blower. The inside/outside air switching box selectively introduces an outside air outside the passenger compartment and an inside air inside the passenger compartment. The blower sucks air from the inside/outside air switching box and blows the air toward the air conditioning unit 10.

The air conditioning unit 10 includes the case 11 that forms an air passage through which conditioning air flows into the passenger compartment. The air flows generally from a front position to a rear position in the case 11 as denoted by an arrow C3 in FIG. 1. The case 11 is constructed of a right case 11a and a left case 11b. The right case 11a and the left case 11b are made of resin.

A partition wall 12 is disposed in a middle position of the case 11 in the left and right direction. The right case 11a and the left case 11b are fastened together in a condition that the partition wall 12 is interposed between them. The partition wall 12 divides an inside space inside the case 11 into a right side air passage 13a and a left side air passage 13b. The partition wall 12 is made of resin.

In a case that the air conditioning unit 10 is mounted on a vehicle with a right-hand drive, the right case 11a constructs a driver side case and the right air passage 13a in the right case 11a constructs a driver side air passage. The left case 11b constructs a passenger (assistant driver) side case and the left air passage 13b in the left case 11b constructs a passenger side air passage.

On the other hand, in a case that the air conditioning unit 10 is mounted on a vehicle with a left-hand drive, the right case 11a constructs the passenger side case and the right air passage 13a in the right case 11a constructs the passenger side air passage.

The left case 11b constructs the driver side case and the right air passage 13b in the left case 11b constructs the driver side air passage.

The case 11 forms an air introduction chamber 14 at its most front position. The air introduction chamber 14 communicates with an air outlet of a scroll casing (not shown)

of the blower unit, so that the air blown by the centrifugal blower is introduced in the air introduction chamber 14.

An evaporator 15, which is a heat exchanger for cooling, and a heater core 16, which is a heat exchanger for heating, are accommodated in the case 11. The evaporator 15 is located air-downstream of the air introduction chamber 15 and is arranged substantially vertically. The evaporator 15 cools the conditioning air by exchanging heat between the air and a refrigerant in a refrigerant cycle system. The heater core 16 is located air-downstream of the evaporator 15, that is, on a rear side of the evaporator 15. Also, the heater core 16 is spaced from the evaporator 15 by a predetermined distance. The air introduced in the air introduction chamber 14 flows through the evaporator 15 and the heater core 16 from the front position to the rear position of the case 11 as denoted by the arrow C3 in FIG. 2.

The heater core 16 is slightly inclined from an upright position so that the upper portion of the heater core 16 is located in the rear from the lower portion of the heater core 16. A hot water (engine coolant) from a vehicle engine (not shown) flows inside the heater core 16. Thus, the heater core 16 heats the air having passed through the evaporator 15 by receiving heat from the hot water.

The partition wall 12 is arranged downstream of the evaporator 15, that is on the rear side of the evaporator 15 in the case 11, as shown in FIG. 2. Specifically, the partition wall 12 is arranged in a dotted region shown in FIG. 1. The partition wall 12 is formed with a slit 12a in which the heater core 16 is engaged to intersect the partition wall 12, so that the heater core 16 is arranged in both of the right and left side air passages 13a, 13b.

As shown in FIG. 1, right cool air bypass passage 17a and left cool air bypass passage 17b are formed above the heater core 16 in the right side air passage 13a and the left side air passage 13b, respectively. The cool air bypass passages 17a, 17b form air passages through which the air having passed through the evaporator 15 bypasses the heater core 16, as denoted by an arrow C1 in FIG. 1. Right air mixing door 18a and left air mixing door 18b are provided between the evaporator 15 and the heater core 16, that is, air-upstream of the cool air bypass passages 17a, 17b, respectively.

The air mixing doors 18a, 18b are constructed of doors in the form of plate, and rotatable about rotation shafts 19a, 19b, respectively. The air mixing doors 18a, 18b open and close right and left air inlet passages 20a, 20b of the heater core 16 and right and left cool air bypass passages 17a, 17b, respectively. In other words, the right air mixing door 18a functions as a right air temperature adjusting means that adjusts a ratio of air volumes between the cool air (denoted by the arrow C1) flowing in the right cool air bypass passage 17a and the air (denoted by the arrow C2) flowing from the right air inlet passage 20a to a right region of the heater core 16 to be heated.

Similarly, the left air mixing door 18b functions as a left air temperature adjusting means that adjusts a ratio of air volumes between the cool air (denoted by the arrow C1) flowing in the left cool air bypass passage 17b and the air (denoted by the arrow C2) flowing from the left air inlet passage 20b to a left region of the heater core 16 to be heated.

The rotation shafts 19a, 19b are rotatably supported by side walls of the right and left cases 11a, 11b and the partition wall 12. The rotation shaft 19a of the right air mixing door 18a is linked to a right temperature control operation mechanism through a linking mechanism (not shown) outside of the right case 11a. Similarly, the rotation shaft 19b of the left air mixing door 18b is linked to a left temperature control operation mechanism through a linking mechanism outside of the left case 11b.

The temperature control operation mechanisms are constructed of actuators including servomotors. Thus, the right and left air mixing door 18a, 18b are separately rotated by the rotation power of the servomotors.

Right air mixing portion 21a and left air mixing portion 21b are formed above the heater core 16 in the right air passage 13a and the left air passage 13b, respectively, for mixing the cool air (denoted by the arrow C1) and the heated air (denoted by the arrow C2). The temperatures of the air to be blown into the right region and the left region in the passenger compartment are adjusted at desirable levels in the right and left air mixing portions 21a, 21b, respectively.

The air having passed through the right and left air mixing portions 21a, 21b are blown into the passenger compartment from a right defroster opening 22a and a left defroster opening 22b, a right face opening 24a and a left face opening 23b, a right front seat foot opening 24a and a left front seat foot opening 24b, and a rear seat foot opening 25, respectively. Although not illustrated, the defroster openings 22a, 22b, the face openings 23a, 23b, and the front seat foot openings 24a, 24b are respectively open and closed by air-blowing mode doors provided therein. The conditioning air flowing into the front seat foot openings 24a, 24b partially flows into the rear seat foot opening 25.

Next, a fixing structure of the partition wall 12, which is interposed between the right case 11a and the left case 11, will be described more in detail. The right and left cases 11a, 11b are formed by injection molding of resin materials such as polypropylene having mechanical strength and elasticity. In injection molding, molten resin is injected into a cavity formed within a molding die, so a molded article has a predetermined shape. After the injection, the molded article is knocked by an ejector pin (pushing pin) and quickly removed from the molding die.

To reduce defects such as deformation and scratches on the molded article by the ejector pin, a plurality of first pin contact portions 27 and a plurality of second pin contact portions 28 are integrally molded with the right case 11a and the left case 11b at positions adjacent to engaging end faces (case end surfaces) 26a, 26b. The first pin contact portions 27 and the second pin contact portions 28 are knocked by the ejector pins for removing the cases 11a, 11b from the molding dies. Thus, the first and second pin contact portions 27, 28 are portions necessary for molding the cases 11a, 11b. The first and second pin contact portions 27, 28 are unnecessary for the shape of the molded products.

As shown in FIGS. 3A and 3B, the first and the second pin contact portions 27, 28 are formed to extend in directions perpendicular to longitudinal directions of the engaging end surfaces 26a, 26b. That is, the first and the second pin contact portions 27, 28 are longitudinal in the direction perpendicular to the sheet of paper of FIG. 1. Also, as shown in FIGS. 3C to 3F, the first and the second pin contact portions 27, 28 have substantially circular-shaped cross-sections. Diameters of the first and second pin contact portions 27, 28 are approximately between 4.0 and 5.0 mm. To maintain strength of the first and second pin contact portions 27, 28, circumferential surfaces of the first and the second pin contact portions 27, 28 are partly integrated with walls of the cases 11a, 11b that form the engaging end surfaces 26a, 26b, that is, the walls of the cases 11a, 11b extending in the direction perpendicular to the sheet of paper of FIG. 1.

Figure 3C:
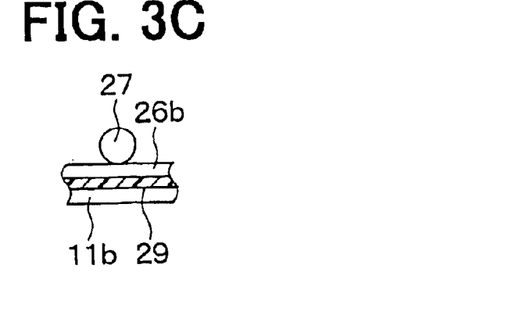
FIG. 3C is a cross-sectional view taken along a line IIIC—IIIC in FIG. 3A.
Figure 3D:
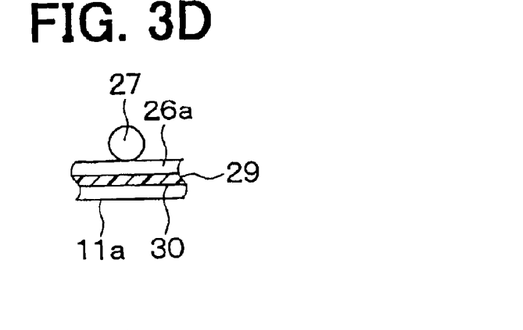
FIG. 3D is a cross-sectional view taken along a line IIID—IIID in FIG. 3A.
Figure 3E:
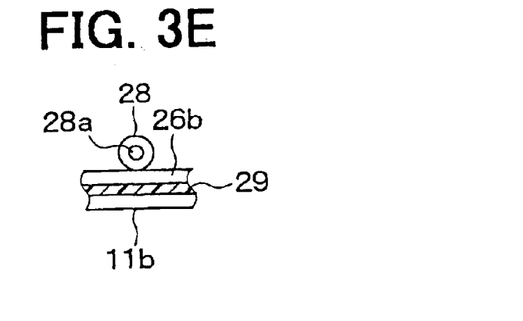
FIG. 3E is a cross-sectional view taken along a line IIIE—IIIE in FIG. 3B.
Figure 3F:
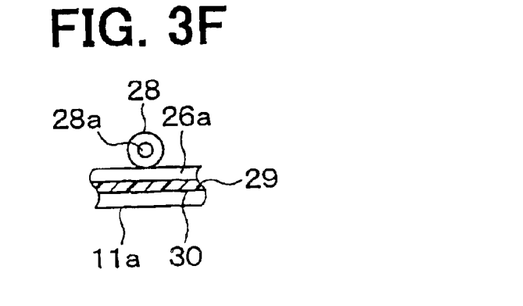
FIG. 3F is a cross-sectional view taken along a line IIIF—IIIF in FIG. 3B.

As shown in FIGS. 3C and 3D, the first pin contact portion 27 has a flat end surface. As shown in FIGS. 3E and 3F, on the other hand, the second pin contact portion 28 has a circular-shaped recession 28a in its end surface. As shown in FIG. 3B, circular-shaped projections 12b are formed on the peripheries of both of the surfaces of the partition wall 12. The circular-shaped projections 12b are formed at positions corresponding to the second pin contact portions 28 so that the circular-shaped projections 12b fit into the circular-shaped recessions 28a.

The right case 11a and the left case 11b have the same number of the first pin contact portions 27 and the same number of the second pin contact portions 28. The first pin contact portions 27 and the second pin contact portions 28 are formed in the proximity of the engaging end surfaces 26a, 26b. The first pin contact portions 27 and the second pin contact portions 28 of the right case 11a are formed at positions opposing to those of the left case 11b. In the embodiment, the respective cases 11a, 11b have for example nine first pin contact portions 27 and four second pin contact portions 28, as sown in FIG. 1.

Here, a thickness of the partition wall 12 is referred to as T. To interpose the periphery of the partition wall 12 between the first pin contact portion 27 and the second pin contact portion 28, the ends of the first pin contact portions 27 are recessed from the engaging end surfaces 26a, 26b by a distance half of the thickness T (½T), as shown in FIG. 3A. That is, the distance between the end surfaces of the opposing pin contact portions 27, 28 is the same as the thickness of the partition wall 12. Similarly, the ends of the second pin contact portions 28 are recessed from the engaging end surfaces 26a, 26b by a distance half of the thickness T (½T), as shown in FIG. 3B.

A linear projection 29 is formed on one of the engaging end surfaces 26a, 26b on the right case 11a or the left case 11b. A linear groove 30 is formed on the opposing engaging end surface 26a, 26b for receiving the linear projection 29. For example, in FIGS. 3A and 3B, the linear projection 29 formed on the engaging end surface 26b of the left case 11b is fitted in the linear groove 30 formed on the engaging end surface 26a of the right case 11a. The linear projection 29 and the linear groove 30 are formed throughout the engaging end surfaces 26a, 26b for sealing the engaging portions between the right case 11a and the left case 11b.

Next, a method of fixing the partition wall 12 and the cases 11a, 11b will be described. First, the partition wall 12 is fixed to one of the right case 11a and the left case 11b such that the circular-shaped projections 12b of one of the surfaces of the partition wall 12 fit into the circular-shaped recessions 28a of the second pin contact portions 28. Here, as shown in FIG. 1, the cases 11a, 11b respectively have three second pin contact portions 28 at the lower side and one second pin contact portion 28 at the upper side. Therefore, the partition wall 12 is properly fixed and located to the first case, selected, of one of the cases 11a, 11b, by engaging the circular-shaped recessions 28a and the circular-shaped projections 12b. Further, by this engagement, the periphery of the partition wall 12 is located on the end surfaces of the first pin contact portion 27.

Next, the remaining case 11a, 11b is fixed to the remaining side of the partition wall 12. The circular-shaped recessions 28a of the second pin contact portions 28 are fitted into the circular-shaped projections 12b of the remaining surface of the partition wall 12. At the same time, the linear projection 29 is fitted into the linear groove 30.

After, the right case 11a and the left case 11b are fastened together by using a fastening device such as clip or screws (not shown). At this time, fastening force by the fastening device is exerted to the fixing portions of the periphery of the partition wall 12. Accordingly, the periphery of the partition wall 12 is securely fixed between the end surfaces of the first pin contact portions 27 and the second pin contact portions 28.

In the embodiment, the first pin contact portion 27 and the second pin contact portion 28 are formed at plurality of positions in the proximity of the engaging end surfaces 26a, 26b to oppose between the right case 11a and the left case 11b. The first pin contact portions 27 and the second pin contact portions 28 are used for removing the cases 11a, 11b from the molding dies by the ejector pin after injection molding. The first pin contact portions 27 and the second pin contact portions 28 are also used for fixing the periphery of the partition wall 12 between them. Therefore, it is not necessary to form specific portions on the cases 11a, 11b for interposing and fixing the partition wall 12.

According to the above fixing structure, the periphery of the partition wall 12 is not interposed between the engaging end surfaces 26a, 26b of the cases 11a, 11b. Therefore, it is not necessary to closely contact the periphery of the partition wall 12 with the entire engaging end surfaces 26a, 26b. The partition wall 12 is fixed by partly interposing its periphery between the end surfaces of the first pin contact portions 27 and the second pin contact portions 28. Accordingly, the partition wall 12 is easily fixed, and the number of working steps reduces.

Since the periphery of the partition wall 12 is not inserted between the engaging end surfaces 26a, 26b of the cases 11a, 11b, the cases 11a, 11b are used not only for the temperature independent control-type air conditioning unit but also for the normal-type air conditioning unit, which does not have the temperature independent controlling function, without changing the shapes of the engaging end surfaces 26a, 26b in the cases 11a, 11b. When the cases 11a, 11b are used for the normal-type air conditioning unit, the partition wall 12 is merely removed. The fixing structure is not limited to the case of the temperature independent control-type air conditioning unit. The fixing structure can be used for merely dividing an inside space of the case with the partition wall.

In the embodiment, the circular-shaped recessions 28a are formed on the end surfaces of the second pin contact portion 28 and the circular-shaped projections 12b are formed on the periphery of the partition wall 12 for constructing the engagement portions. Alternatively, the circular-shaped projection 12b can be formed on the end surface of the second pin contact portion 28 and the circular-shaped recessions 28a can be formed on the periphery of the partition wall 12.

The present invention should not be limited to the disclosed embodiments, but may be implemented in other ways without departing from the spirit of the invention.

What is claimed is:

1. An air conditioning unit for a vehicle comprising:
    a case defining an air passage through which air flows toward a passenger compartment of the vehicle; and
    a partition wall disposed in the case to divide the air passage into a first air passage through which air flows toward a right region of the passenger compartment and a second air passage through which air flows toward a left region of the passenger compartment,
    wherein the case includes a first case for forming the first air passage and a second case for forming the second air passage,
    wherein the first case has a first case end surface and the second case has a second case end surface, and the first case and the second case are joined to each other by connecting the first case end surface and the second case end surface, wherein each of the first case and the second case has a plurality of pin contact portions, and the partition wall is interposed between the pin contact portions of the first case and the pin contact portions of the second case.

2. An air conditioning unit according to claim 1, wherein the pin contact portions of the first case are disposed to oppose the pin contact portions of the second case in the proximity of the first case end surface and the second case end surface.

3. An air conditioning unit according to claim 1, wherein the pin contact portions are integrally molded with the first case and the second case, wherein the pin contact portions are disposed to extend in directions perpendicular to the first case end surface and the second case end surface and have substantially circular-shaped cross-sections.

4. An air conditioning unit according to claim 1, wherein at least one of the pin contact portions has an engaging portion, which engages with an engaging portion of the partition wall, on its end surface, wherein the engaging portions are constructed of a recession and a projection.

5. An air conditioning unit according to claim 1, wherein an end surface of the pin contact portion of the first case is spaced from an end surface of the opposing pin contact portion of the second case by a distance substantially same as a thickness of the partition wall.

6. An air conditioning unit according to claim 1, wherein each of the pin contact portions is disposed such that its end surface is recessed by a distance half of a thickness of the partition wall from the case end surface.

7. An air conditioning unit according to claim 1, wherein the first case and the second case are resin moldings, and the pin contact portions are provided as portions for receiving ejector pins when the moldings are removed from molding dies.

8. An air conditioning unit according to claim 1, further comprising:

a temperature control unit provided in the case, the temperature control unit including:

a first heat exchanger for cooling air;

a second heat exchanger for heating the air having passed through the first heat exchanger, wherein the second heat exchanger is disposed so that it is located in both the first air passage and the second air passage;

a first air mixing door rotatably provided in the first air passage between the first heat exchanger and the second heat exchanger for adjusting a volume of air introduced into the second heat exchanger; and a second air mixing door rotatably provided in the second air passage between the first heat exchanger and the second heat exchanger for adjusting a volume of air introduced into the second heat exchanger, wherein the first air mixing door and the second air mixing door are separately operated, thereby separately controlling temperature of air in the right region and the left region of the passenger compartment.

9. An air conditioning unit according to claim 8, wherein the partition wall is formed with a slit and the second heat exchanger is disposed in the slit to intersect the partition wall.

\* \* \* \* \*